United States Patent
Svedman

(10) Patent No.: US 11,286,205 B2
(45) Date of Patent: Mar. 29, 2022

(54) HYDROPHOBIC CONCRETE MIXTURE

(71) Applicant: SVEDMANS RUMSUTHYRNING HB, Ånge (SE)

(72) Inventor: Kjell Svedman, Ånge (SE)

(73) Assignee: Conpore Technology AB, Sundsvall (SE)

( * ) Notice: Subject to any disclaimer, the term of this patent is extended or adjusted under 35 U.S.C. 154(b) by 673 days.

(21) Appl. No.: 15/764,503

(22) PCT Filed: Sep. 30, 2016

(86) PCT No.: PCT/EP2016/073523
§ 371 (c)(1),
(2) Date: Mar. 29, 2018

(87) PCT Pub. No.: WO2017/055616
PCT Pub. Date: Apr. 6, 2017

(65) Prior Publication Data
US 2020/0239364 A1  Jul. 30, 2020

(30) Foreign Application Priority Data
Sep. 30, 2015  (SE) .................................. 1500390-8

(51) Int. Cl.
*C04B 14/06*  (2006.01)
*C04B 14/12*  (2006.01)
(Continued)

(52) U.S. Cl.
CPC ............ *C04B 20/008* (2013.01); *C04B 14/06* (2013.01); *C04B 14/12* (2013.01); *C04B 18/16* (2013.01);
(Continued)

(58) Field of Classification Search
CPC ....... C04B 20/008; C04B 14/06; C04B 14/12; C04B 18/16; C04B 24/34; C04B 28/04; C04B 40/0028; C04B 2103/402; C04B 2111/00146; C04B 2201/20; C04B 28/02; C04B 38/10; C04B 24/23; C04B 38/02; C04B 18/167; C04B 7/246; C04B 40/0046; C04B 20/00; C04B 40/00; Y02W 30/91;
(Continued)

(56) References Cited

U.S. PATENT DOCUMENTS 4,895,598 A * 1/1990 Hedberg ................. C04B 28/02
106/694
6,022,407 A * 2/2000 Stridh .................... C04B 24/20
106/678

FOREIGN PATENT DOCUMENTS

EP    1645609    4/2006
EP    2364962    9/2011
(Continued)

OTHER PUBLICATIONS

Kraton Corp, "Product Data Sheet: AQUATAC 6085 Dispersions", Oct. 27, 2016, URL: http://www.kraton.com/products/prodDoc/pds/AQUATAC%206085%20PDS.pdf.

*Primary Examiner* — Kevin E Yoon
*Assistant Examiner* — Marites A Guino-O Uzzle
(74) *Attorney, Agent, or Firm* — Rolf Fasth; Fasth Law Offices

(57) ABSTRACT

The pumpable aqueous concrete mixture has an air pore volume of 10-85 volume-%, that includes a hydrophobic resin at least partially soluble in the concrete mixture and optionally an aggregate material.

6 Claims, 6 Drawing Sheets

(51) Int. Cl.
  *C04B 18/16* (2006.01)
  *C04B 20/00* (2006.01)
  *C04B 24/34* (2006.01)
  *C04B 28/04* (2006.01)
  *C04B 40/00* (2006.01)
  *C04B 38/10* (2006.01)
  C04B 103/40 (2006.01)
  C04B 111/00 (2006.01)

(52) U.S. Cl.
  CPC .............. *C04B 24/34* (2013.01); *C04B 28/04* (2013.01); *C04B 38/10* (2013.01); *C04B 40/0028* (2013.01); C04B 2103/402 (2013.01); C04B 2111/00146 (2013.01); C04B 2201/20 (2013.01)

(58) Field of Classification Search
  CPC ...... F27B 15/006; F27B 15/14; F27D 17/004; Y02P 40/10; F28C 3/14
  See application file for complete search history.

(56) References Cited

FOREIGN PATENT DOCUMENTS

| | | |
|---|---|---|
| WO | 9739992 | 1/1997 |
| WO | 9936665 | 7/1999 |

\* cited by examiner

HYDROPHOBIC CONCRETE MIXTURE

PRIOR APPLICATIONS

This is a US national phase patent application that claims priority from PCT/EP2016/073523, filed 30 Sep. 2016, that claims priority from Swedish Patent Application No. 1500390-8, filed 30 Sep. 2015.

TECHNICAL FIELD

The present invention relates to a pumpable aqueous concrete mixture, use of such a concrete mixture and a method for producing such a concrete mixture.

BACKGROUND

In concrete industry today, it may in many applications be preferred to use a concrete having a low density. It is known that the addition of an anionic surface active compound may improve the strength of the material. WO 97/39992 discloses that concrete having a density of 250-2200 kg/m$^3$ and an air pore volume from 15 to 90%, preferably from 20-85% and high strength, especially at low densities, can be casted from a pumpable aqueous concrete mixture having an air pore volume of 10-85%, which contains an anionic surface active compound having two sulphonic acid groups of the general formula

$$(R)_m—R_1—(SO_3M) \qquad (I).$$

However, such a concrete still suffers from problems related to the loss of air from the concrete, resulting in an increased density, especially when the concrete mixture furthermore comprises lightweight aggregate material. Furthermore, aggregate materials tend to have properties which disturb the viscosity of the concrete mixture. Still further, the addition of lightweight aggregate materials typically affects the water-repellent properties of the concrete.

In brief, there is a need for improved pumpable aqueous concrete mixture having excellent water-repellent properties when cast. Furthermore, there is a need for a use of such a pumpable aqueous concrete mixture having excellent hydrophobic, water-repellent properties and high stability. Still further, there is a need for an improved method for producing pumpable aqueous concrete mixture. There is also a need for a use of a concrete mixture having excellent hydrophobic, water-repellent properties for casting hydrophobic, water-repellent concrete.

DISCLOSURE OF THE INVENTION

It is an object of the invention to at least alleviate some of the drawbacks associated with prior art techniques.

Yet another object of the invention is to provide a pumpable aqueous concrete mixture that has a high stability during handling and pumping.

In particular it is an object of the invention to provide an aerated concrete having excellent homogeneity and excellent strength even at low densities.

Another object of the invention is to provide a concrete mixture having superior hydrophobic and water-repellent properties.

An additional object is to provide a concrete mixture comprising a resin that is readily dispersed and homogenously distributed within the concrete mixture.

A further object of the invention is to provide a concrete mixture which provides excellent and homogenous adhesion between cement and aggregate materials in the mixture.

It is an object of the invention to provide a concrete mixture which has hydrophobic, water-repellent properties and an excellent stability so that it may be cast on or under water.

A still further object of the invention is to provide a method for producing a pumpable, aqueous concrete mixture having which can be casted to an aerated concrete having excellent homogeneity and thus excellent strength even at low densities, as well as having hydrophobic, water-repellent properties.

A still further object of the invention is to provide a method for producing a pumpable, aqueous concrete mixture having excellent hydrophobic, water-repellent properties, as well as an excellent stability and reproducibility.

It is an further object of the invention to provide a use of a pumpable, aqueous concrete mixture for casting aerated concrete having excellent homogeneity and thus excellent strength even at low densities, as well as having hydrophobic, water-repellent properties.

The above mentioned objects, as well as other objects apparent to a person skilled in the art, are each addressed by the aspects of the present invention.

In an aspect thereof, the present invention provides a pumpable aqueous concrete mixture having an air pore volume of 10-85 volume-%, comprising a hydrophobic resin at least partially soluble in the concrete mixture, and optionally an aggregate material. It has surprisingly been found that a concrete having a density of 250-2200 kg/m$^3$ and an air pore volume from 15-90 volume-%, preferably 20 to 85 volume-% and high strength and excellent hydrophobic, water-repellent properties can be obtained by casting it from a pumpable, aqueous concrete mixture having an air pore volume of 10 to 85 volume-%, wherein the concrete mixture comprises cement, water, a hydrophobic resin at least partially soluble in the concrete mixture, and optionally an aggregate material.

According to some embodiments the hydrophobic resin comprises dispersible particles of the resin having a mean particle size of less than 0.7 µm. According to some embodiments, the hydrophobic resin has an average particle size in the range of 0.4-0.6 µm, such as about 0.5 µm. The water to cement ratio of the present invention is typically in the range of 0.35-0.80, by weight. The pH of the concrete mixture is typically in the range of 9-13.

The term "air pore volume" as referred to herein is supposed to denote the amount of air present in the concrete mixture. The "air pore volume" is related to the density of the concrete mixture. A high air-pore volume relates to a low density. A low air pore volume relates to a high density. The air pores in the mixture is typically created by entraining air to a concrete mixture during agitation. The air pore formation may also be enhanced by the addition of air-entraining additives to the concrete mixture.

The term "pumpable" as referred to in the present disclosure means that the concrete mixture is stable enough to withstand the high pressures associated with pumping. Furthermore, the concrete mixture has a sufficiently low viscosity to allow pumping. Due to the air pores in the concrete mixture the concrete mixture may be subject to compression during for example pumping.

The term "aggregate materials" as referred to herein refers to a coarse particulate material which may be added to the concrete mixture in order to control the density of the concrete mixture. The aggregate materials may be low density aggregate materials, such as light expanded clay aggregates, typically having a density below 400 kg/m³. The aggregate materials may also be high density aggregate materials, such as sand, gravel and old building material, such as ground concrete.

A pumpable, aqueous concrete mixture according to the invention is advantageous for several reasons. A concrete mixture according to the invention comprising a hydrophobic resin at least partially soluble in the concrete mixture, and preferably having a mean particle size of less than 0.7 μm, provides the concrete mixture prepared according to the invention with excellent stability and high reproducibility as well as excellent water-repellent properties.

Furthermore, it has also been found that the mean particle size of the resin particles in the concrete mixture has an effect on the homogeneity of the concrete mixture. Furthermore, the concrete mixture comprising resin having a particle size of less than 0.7 μm has excellent hydrophobic, water-repellent properties. As referred to herein, the mean particle size refers to the average size of the resin particles before addition to the concrete mixture. A mean particle size of the resin of less than 0.7 μm is advantageous in that, when added to the concrete mixture, it yields a dispersion which may be well distributed within the concrete mixture. Furthermore, the resin may be at least partially soluble in the concrete mixture. The resin may further be at least partially dissolved in the concrete mixture.

The resin may preferably be added to the mixture as resin dispersion, typically comprising resin, water and possibly one or several dispersing agents. The resin may also be added to the mixture as a powder.

It has surprisingly been found that using hydrophobic resin particles being at least partly soluble in the concrete mixture allows the resin to be at least partially dissolved in and readily and homogenously distributed within the concrete mixture. This is advantageous for several reasons. For example, one advantage is that the concrete mixture according to the invention provides an interaction between the cement grains of the concrete mixture and the resin. The hydrophobic resin and the cement grains typically exhibit excellent adhesion, especially when the resin is at least partially dispersed in the concrete mixture. This interaction and adhesion provides the concrete mixture with excellent hydrophobic properties. The interaction provides a homogenous distribution of cement around the air pores. This interaction also provides concrete cast from the concrete mixture of the invention with excellent hydrophobic, water-repellent properties. It also provides such concrete with excellent strength, even at low densities.

The hydrophobic, water-repellent properties of the concrete mixture of the present invention are such that the mixture does not substantially mix with water. Furthermore, the stability of the concrete mixture is such that aggregate material is substantially non-separable from the concrete mixture, even when the concrete mixture is contacted with water.

Another advantage, when the concrete mixture further comprises an aggregate material, is that the homogenous distribution of at least partially dissolved resin within the concrete mixture provides an excellent adhesion between the concrete mixture and the aggregate materials. The hydrophobic resin dispersions disclosed herein provides adhesion between the cement and hydrophobic aggregate materials. It furthermore provides adhesion between the cement and hydrophilic aggregate materials. The adhesion between the cement and the aggregate material gives the concrete mixture excellent water repellent properties, owing to a homogenous distribution of cement around the aggregate materials provided by this adhesion. The adhesion between the concrete mixture and the aggregate materials are described hereinbelow with reference to the FIGS. 1-6.

As shown in FIG. 1, the concrete mixture of the invention provides homogenous distribution of aerated concrete around a low density aggregate material. The light grey matter is concrete and the darker matter is aggregate material.

FIG. 2 shows a cross-section of a sawn low density aggregate particle, surrounded by an aerated concrete cast from the concrete mixture of the invention. The concrete mixture surrounds the aggregate particle completely. It can be seen that the concrete comprises air pores.

FIG. 3 shows the adhesive interface between a low density aggregate particle and concrete cast from the concrete mixture of the invention. It can be seen that the adhesive interface is homogenous. No air pores are present at the interface.

FIG. 4 shows the interface between FIG. 3 shows the adhesive interface between a low density aggregate particle and concrete cast from the concrete mixture of the invention at a magnification of 200×.

FIG. 5 shows the interface between FIG. 3 shows the adhesive interface between a low density aggregate particle and concrete cast from the concrete mixture of the invention at a magnification of 400×. No air pores can be observed in the concrete near the adhesive interface. The distribution of concrete in the interface is homogenous.

FIG. 6 shows the interface between FIG. 3 shows the adhesive interface between a low density aggregate particle and concrete cast from the concrete mixture of the invention at a magnification of 1000×. No resin particles are visible, indicating that substantially all of the added resin has been dissolved in the concrete mixture. The dissolved resin is visible as a veil surrounding the aggregate particle. If the resin had been present as dispersed particles, they would have been visible as white dots in FIG. 6. In prior art solutions, the resin particles are typically dispersed and not dissolved in the concrete mixture.

The homogenous distribution of concrete mixture around the aggregate materials reduces the formation of holes between the cells of the concrete, thus enhancing the hydrophobic properties of the concrete mixture. Such holes might otherwise act as points of entry of water into the structure. They may also facilitate the transport of water within the structure.

Larger resin particles having a mean particle size of more than 0.7 μm, and not being soluble in the concrete mixture may agglomerate when contact occurs between the particles in the mixture, especially when the mixture is compressed due to the high pressures associated with pumping. This may lead to too high concentration of hydrophobic resin particles on the surface of the aggregate materials, shifting the hydrophilic-hydrophobic balance on the surface of the aggregate materials which may accelerate a migration of resin particles out of the concrete, leading to reduced water-repellent properties.

A further advantage of the present invention is that the concrete mixture may be cast on water. If a concrete mixture of the invention, with a high air pore volume and thus low density is prepared, the concrete mixture may be cast on water, so that the concrete mixture cures when floating on the water. The cast concrete may also float on water without substantial uptake of water. A concrete mixture according to the invention with a lower air pore volume and thus a higher density may be cast under water with excellent stability and strength. The hydrophobic properties of the concrete mixture as well as the cast concrete, owing to the homogenous distribution of a resin having an average particle size of less than 0.7 µm which makes the concrete mixture of the present invention suitable for wet applications. The concrete mixture of the invention may be cast under water to a concrete having a low density of 1400 kg/m$^3$, with excellent strength and hydrophobic, water-repellent properties. This is extremely advantageous and provides the concrete mixture of the invention with large economic benefits, as compared with prior art solutions. Typically, a concrete having a density of at least 2300 kg/m$^3$ is required for casting under water. A high density concrete puts higher demands on the retaining wall, which increases the cost associated with casting under water.

The resin of the present disclosure may be a synthetic or natural resin, or derivatives thereof, having molecular weights of usually below 10,000 and a saponification number of 100-250. The resin may be at least partially soluble in the concrete mixture, preferably substantially fully soluble in the concrete mixture. The resin may have a viscosity (Brookfield, 25 degrees C., 50 rpm, cps) in the range of 400-1200, such as 600. The resin may be added as a dispersion having a pH in the range of 8.0-9.5, such as 8.5. The resins and their derivatives may comprise one or more aromatic and/or aliphatic groups having at least 12, preferably 16-35 carbon atoms. The groups may be saturated or unsaturated. Preferred resins are such having an acid number from 10-25, such as 20 and a saponification number from 150 to 175. Examples of suitable resins are various resin acids and mixtures thereof, such as colophonium, and their dimerised derivatives and wholly or partly esterified and/or hydrated derivatives thereof. The resin may be a tall oil rosin. The amount of resin added to the concrete mixture disclosed herein is typically in the range from 210-840 g per cubic meter of the concrete mixture. It is important that the resin does not accelerate or retard the chemical reactions involved in concrete formation.

Cement is as hydraulic binder, which by the addition of water forms a paste and cure by hydration. The curing is mainly dependent on the formation of calcium silicate hydrate. The most important silicate-cement-containing composition is Portland cement clinker. The cement of the present disclosure is preferably Portland cement, owing to its good all-round properties. Portland cement comprises tricalcium silicate, tricalcium aluminate and calcium aluminium ferrite. Other examples of suitable types of cement are Portland blast-furnace cement, white Portland cement, low-heat Portland cement and rapid-hardening Portland cement, which are all based on Portland cement clinker. The cement of the present disclosure may also be aluminate cement. Aluminate cement may typically be used in applications which require fireproof materials. The addition of a resin according to the present invention to a concrete mixture comprising aluminate cement does not affect the temperature range in which the concrete cast from a concrete mixture comprising aluminate cement may be used. Concrete cast from a concrete mixture according to the invention comprising aluminate cement will have excellent water-repellent properties. This is advantageous in case of the concrete being subject to a fire. Owing to the water-repellent properties of the concrete, substantially no water is present in the pores of the concrete, which substantially reduces the risk of cracking due to the high temperature, which in conventional concrete may occur due to an increase in vapor pressure within the water-comprising pores.

The cement of the present disclosure may furthermore be a mixture of Portland cement and aluminate cement. The addition of aluminate cement to the Portland cement may shorten the time required to cure the concrete mixture.

The concrete mixture according to the invention has such a high strength and stability that it may be casted on various bases such as saw dust, sand and even water with high reproducibility; it is well suited for to make light concrete constructions without necessarily reducing the volume of the construction. A concrete mixture according to the invention may even be casted under water. The aerated concrete may also be used for ground and road building settlements improve the stability or reduce the horizontal pressure exerted on structural supports. The aerated concrete can also be used as fillings around conduits, when refilling conduit ditches and cavities.

The concrete mixture disclosed herein may furthermore comprise additional additives, such as an anionic surface active compound, such as the anionic surface active compound being disclosed in WO97/39992. It may also comprise other types of anionic surface active compounds; non-ionic compounds, such as ethylene oxide adducts; cationic compounds; hydrophobising additives; solubilising compounds, such as ethylene glycol and its mono- or dimethyl or ethylethers having a molecular weight of up to 300; and water-retaining and plasticity-increasing additives (plasticisers), such as non-ionic cellulose ethers and polyalkylene glycols having molecular weights above 400.

In some embodiments the hydrophobic resin comprises dispersible particles of the resin having a mean particle size in the range of 0.4-0.6 µm, such as about 0.5 µm. The resin may furthermore have a mean particle size of less than 0.6 µm. The mean particle size may also be in the range of 0.1-0.6 µm, such as 0.2-0.6 µm, preferably 0.3-0.6 µm. The particle size may also be in the range of 0.5-0.7 µm, such as 0.5-0.6 µm, such as 0.6-0.7 µm. The particle size may also be in the range of 0.2-0.5 µm. It has been found that the mean particle size of the resin particles affects the solubility of the resin particles in the concrete mixture. A particle size in the range of 0.4-0.6 µm is believed to further increase the solubility of the resin in the concrete mixture. A particle size in the range of 0.4-0.6 µm, such as about 0.5 µm gives rise to several advantages, some of which will be discussed herein. One advantage is that it gives rise to an at least partial dissolution of resin in the concrete mixture that further improves the homogenous distribution of resin within the concrete mixture. Such a homogenous distribution allows substantially all of the added resin to form part in the adhesion between the aggregate materials and the concrete mixture.

In some embodiments, the concrete mixture comprises 210-840 g of the hydrophobic resin per m$^3$ of concrete mixture. The concrete mixture may comprise 300-700 g of the hydrophobic resin per m$^3$. It may also comprise 350-500 g of the hydrophobic resin per m$^3$ concrete mixture, such as 420 g hydrophobic resin per m$^3$ concrete mixture. The resin may be added in the form of a resin dispersion comprising resin, water, and possibly one or several dispersion agents. For a resin dispersion having resin content of 60%, the amount of resin corresponds to an amount in the range of 0.35-1.4 kg resin dispersion per m$^3$ concrete mixture. The amount of hydrophobic resin soluble in the concrete mixture may be to an amount of more than 10% of the added amount, such as more than 20% of the added amount, such as more than 30% of the added amount, such as more than 40% of the added amount, such as more than 50% of the added amount, such as more than 60% of the added amount, such as more than 70% of the added amount, such as preferably more than 80% of the added amount, such as more than 90% of the added amount, such as more than 95% of the added amount.

In some embodiments of the present invention, the water to cement weight ratio may be in the range of 0.30 to 0.80, such as 0.40-0.70, preferably about 0.69. One advantage of the invention is that in concrete mixtures having an theoretical water to cement weight ratio of above 0.5, based on the added amounts of water and cement, the concrete mixture of the invention may have an actual water to cement weight ratio lower than the theoretical water to cement weight ratio based on the added amounts of water and concrete. For example, a concrete mixture having a theoretical water to cement weight ratio of 0.7 may obtain an actual water to cement weight ratio in the range 0.5-0.6. This allows for a pumpable concrete mixture where additional water will be present in the concrete mixture. The additional water will leak out of the concrete mixture when the concrete mixture is in rest after pouring. Not wishing to be bound by any specific scientific theories, it is believed that this effect is due to the adhesive interaction between the hydrophobic resin soluble in the concrete mixture and the cement particles.

In some embodiments of the present invention, the air pore volume may be in the range of 18-75 volume-%, such as 25-75 volume-%. A high air pore volume is associated with a low density. A low air pore volume is associated with a high density. The concrete mixture of the invention may be cast into a concrete with high strength and a high air pore volume. The air pores in the concrete mixture allows the concrete mixture to be compressed during for example pumping.

In some embodiments, the concrete mixture comprises:
100 parts by weight of cement,
35-80 parts by weight of water,
0-500 parts by weight of an aggregate material,
0.20-0.85 kg of the hydrophobic resin per m$^3$ of concrete mixture, and optionally
0.005-1 parts by weight of an anionic surface active compound.

In some embodiments of the present invention the resin is added in an amount in the range of 210-840 g per m$^3$ concrete mixture. The amount of added resin affects the amount of resin that can be dissolved in the concrete mixture. If the amount of resin is too high concrete mixture may become saturated and most of the added resin will be present dispersed in the concrete mixture.

As an example, the concrete mixture may comprise:
294.25 kg cement
202.5 kg water
2.750 kg anionic surface active compound
0.420 kg dispersable hydrophobic resin.
This yields a water to cement weight ratio of 0.69.

In one aspect, there is provided a pumpable aqueous concrete mixture having an air pore volume of 10-85 volume-%, comprising a dispersable hydrophobic resin having a mean particle size of less than 0.7 μm.

In one aspect, there is provided a concrete having a density of 250-2200 kg/m$^3$ and an air pore volume in the range of 15-90 volume-%, wherein the concrete is obtained by letting a concrete mixture according to any one of the preceding claims cure. The concrete mixture of the invention may be cured into a concrete having excellent strength, even at low density. It furthermore has great hydrophobic, water-repellent properties. The concrete cast from the concrete mixture of the invention is very versatile and may used in several applications.

In yet another aspect of the invention there is provided a use of a mixture according to the invention for casting an aerated concrete having a density in the range of 250-2200 kg kg/m$^3$. The cast concrete may furthermore have an air pore-volume in the range of 15-90 volume-%, such as 20-85 volume-%.

There is also provided, in another aspect of the invention a use of a dispersible hydrophobic resin as disclosed herein, when producing a pumpable, aqueous concrete mixture. The dispersible hydrophobic resin may be substantially dissolved in the concrete mixture.

In another aspect of the present invention, there is provided method for producing a pumpable aqueous concrete mixture having an air pore volume of 10-85 volume-% in a concrete mixer, the method comprising the following steps:
a) providing water, 2-40 weight-% of a total amount of cement, a dispersible hydrophobic resin at least partially soluble in the concrete mixture and having a particle size of less than 0.7 μm, and optionally other additives to the mixer;
b) agitating the added ingredients while entraining air to a homogenous, stable, air-containing mixture wherein the resin is at least partially dissolved in the mixture; and
c) adding in one or more steps or continuously during mixing the remaining 60-98 weight-% of the total amount of cement.

Step a) may further comprise providing an aggregate material to the mixer.

Step a) may also further comprise the provision of other organic additives to the mixer. The concrete mixture produced according to the invention may be cast into an aerated concrete having a density in the range of 250-2200 kg/m$^3$.

The resin may, in step b) at least be dissolved in an amount of more than 10% of the added amount, such as more than 20% of the added amount, such as more than 30% of the added amount, such as more than 40% of the added amount, such as more than 50% of the added amount, such as more than 60% of the added amount, such as more than 70% of the added amount, such as preferably more than 80% of the added amount, such as more than 90% of the added amount, such as more than 95% of the added amount.

In another aspect, there is provided a method for producing concrete having a density of 250-2200 kg/m3 and an air pore volume in the range of 15-90 volume-%, wherein the concrete is obtained by casting a pumpable, aqueous concrete mixture obtained according to the method described herein and subsequently curing the concrete mixture.

In some embodiments, the concrete mixture is produced according to the invention.

Another method for producing a concrete mixture, which can be casted into an aerated concrete having a density below 1600 kg/m$^3$, preferably below 800 kg/m$^3$, comprises adding, in discontinuous or continuous concrete mixer, water, an anionic surfactant, a resin according to the invention and, optionally, other organic additives, and a first amount of cement, typically 2-40 wt %, preferably 5-30 wt-% of the total amount of cement. The resulting composition is stirred during increase in volume to a homogenous, stable air-comprising concrete mixture, after which the remaining cement is added to the mixer in one or more steps, or in a continuous fashion and is admixed during agitation. The resulting aqueous, pumpable concrete mixture may have an air pore volume in the range of 10-85 volume-%.

A further method that is suitable for producing aerated concrete comprising aggregate material, such as high-density aggregate material, is to first mix water, an anionic surface active compound, a resin as disclosed herein and optionally other organic additives, and then add the resulting fluid mixture to a mixture of cement and aggregate materials during agitation, which yields high frictional forces between the aggregate grains, which facilitates the formation of a homogenous fluid concrete mixture. The density of concrete casted from such a mixture is usually above 800 kg/m$^3$, and preferably between 1200 and 2100 kg/m$^3$.

BRIEF DESCRIPTION OF THE FIGURES

Referring now to the figures, which are exemplary embodiments.

EXAMPLES

Example 1

Figure 1:
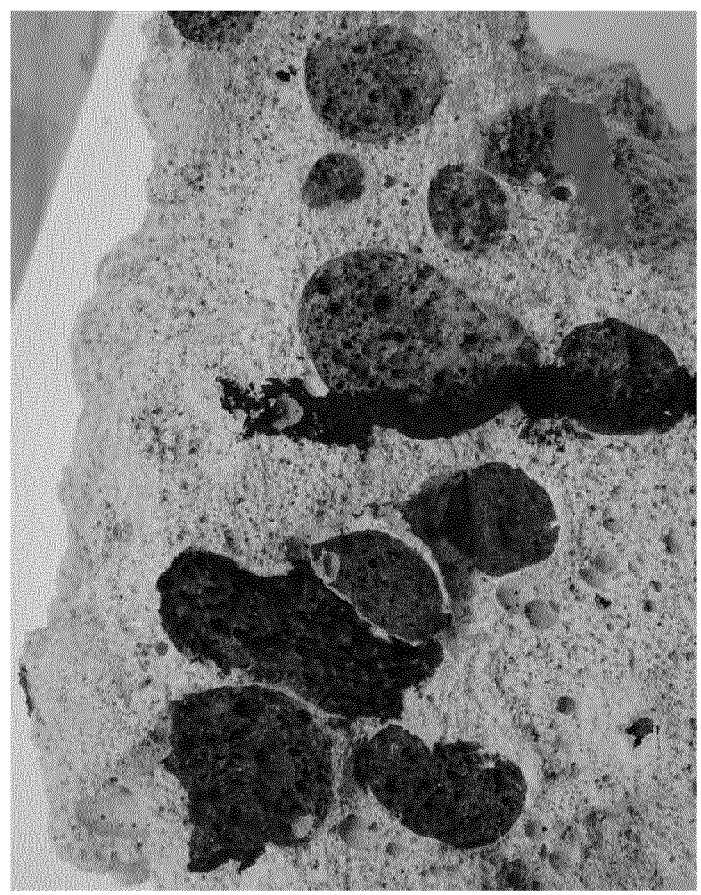
FIG. 1 shows an aerated concrete comprising low density aggregate material cast from the concrete mixture of the present invention. To the left of the black line a fractured surface is shown. To the right of the black line sawn surface is shown.
Figure 2:
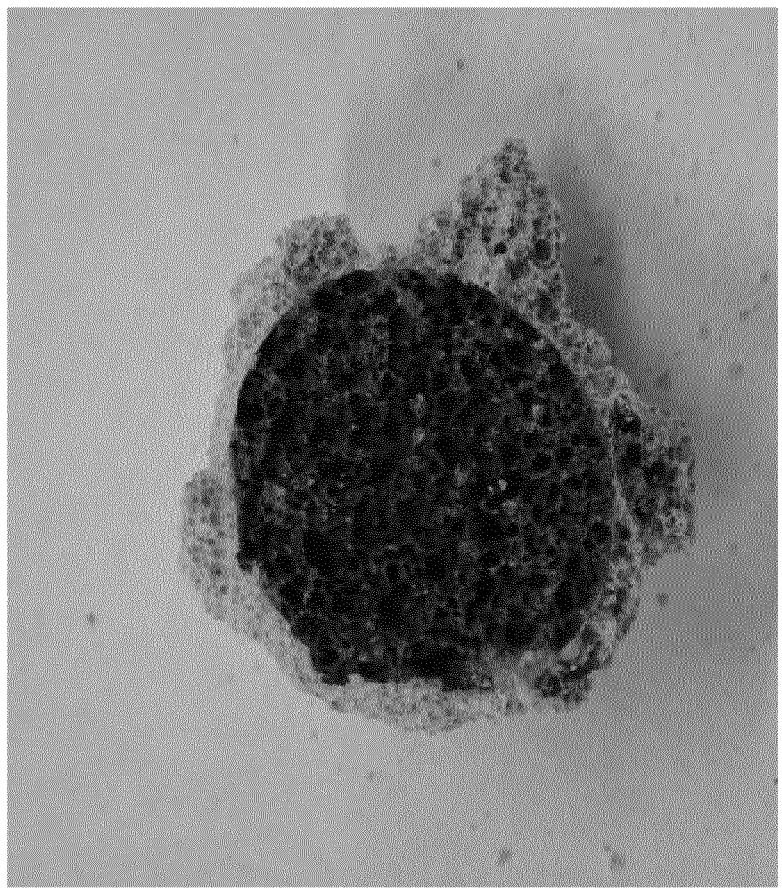
FIG. 2 shows a sawn cross-section of a particulate of a low density aggregate material, surrounded by an aerated concrete cast from the concrete mixture according to the invention.
Figure 3:
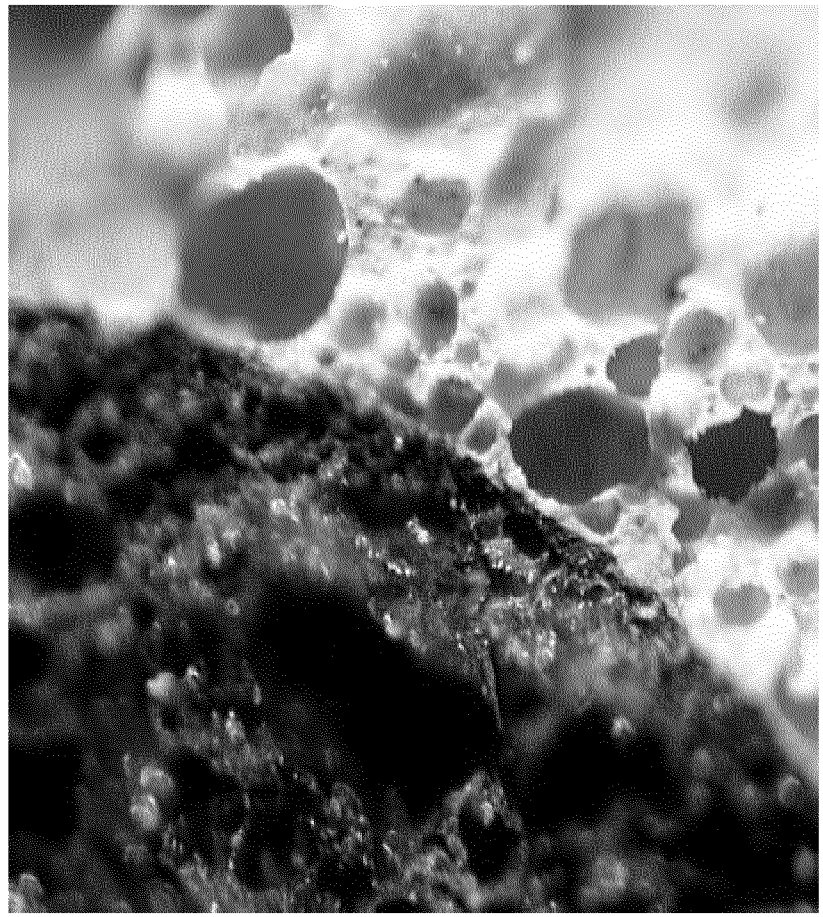
FIG. 3 shows the cross-section of FIG. 2 in higher magnification.
Figure 4:
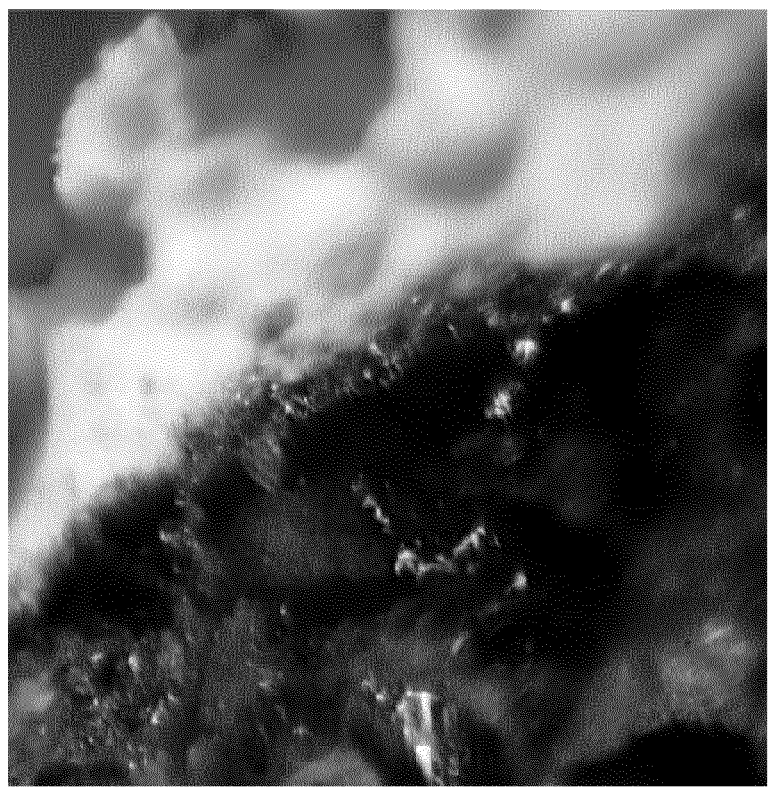
FIG. 4 shows the adhesion at the interface between the aggregate material and the aerated concrete at 200× magnification.
Figure 5:
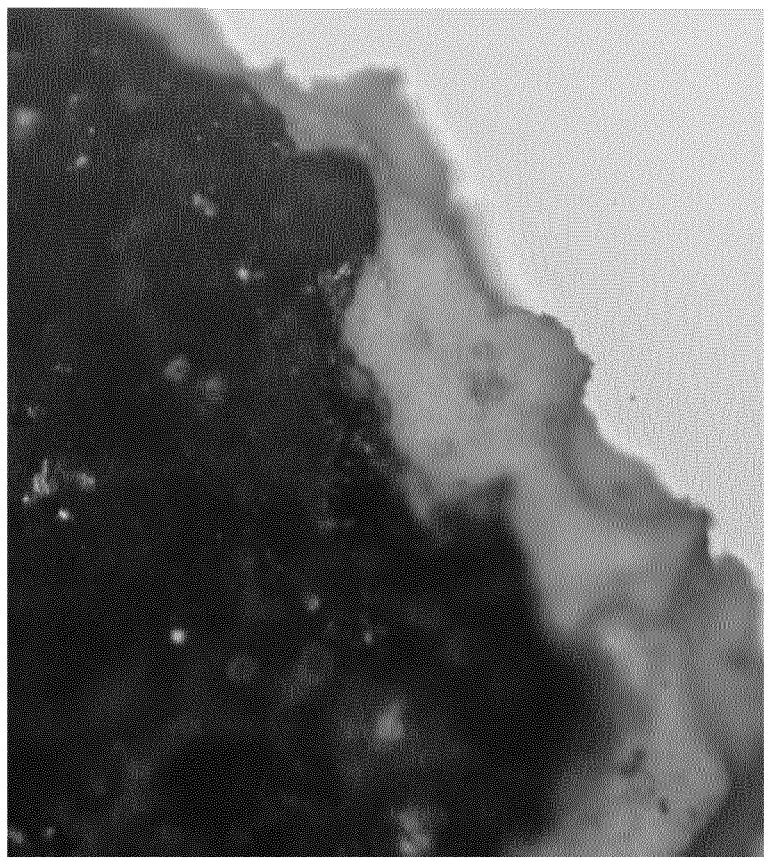
FIG. 5 shows the adhesion at the interface between the aggregate material and the aerated concrete at 400× magnification.
Figure 6:
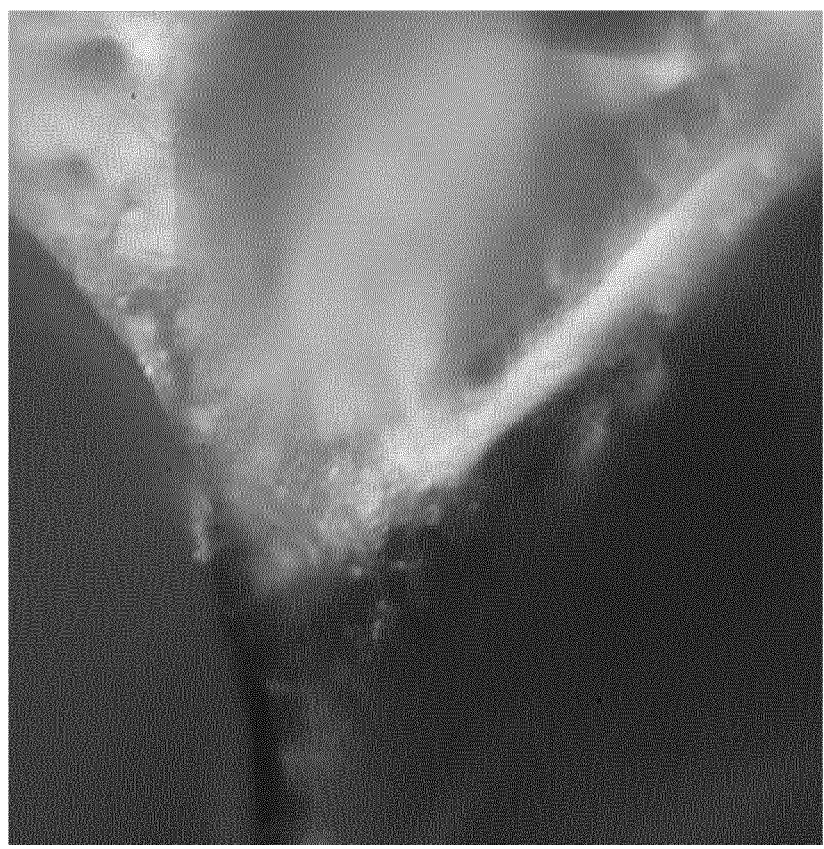
FIG. 6 shows the adhesion at the interface between the aggregate material and the aerated concrete at 100× magnification

For producing aerated concrete having a wet density of 500 kg/m$^3$, the following step-wise procedure took place. Into a laboratory mixer having a volume of 40 liters, 8.1 kg of water, a tenside mixture comprising a mix of 60% of a tenside sold under the trade name Dowfax 3B2™ tenside and 40% of a tenside sold under the trade name Darex AEA™ tenside, a resin as indicated below (added as a dispersion unless otherwise noted) and 4.1 kg of Portland cement was supplied. The compounds were stirred at a speed of 380 rpm for 25 s and resulted in a aerated concrete mixture. Then 7.6 kg of Portland cement was added continuously to the mixer within 70 s during agitation at a speed of 166 rpm. The agitation continued for further 320 s until a concrete mixture was obtained. The concrete mixture was the subjected to pouring test to test the stability during handling, casting test, where the concrete mixture is cast on different bases such as water, dry sand, absorbing bases, steel molds. During the casting test, no settlements should be obtained. Specimens of the casted concrete were then analyzed in a microscope. The shape of the air pores, the size of the air pores, the fracture surface, the pore wall stiffness and roundness is analyzed and given a pass or fail mark. In the following table, the samples marked "pass" have passed all the tolerance in all of the above mentioned analyzes. The samples marked "fail" have failed at least one of the above mentioned analyzes. The results are presented in Table 1.

The added resins are all available on the market as resin dispersions, and the amount added denotes the amount of resin added.

TABLE 1

| Resin | Average particle size (µm) | Amount | Pass/Fail |
|---|---|---|---|
| Aquatac XR4343 | 0.5 | 8.4 g | Fail |
| | 0.5 | 16.8 g | Pass |
| | 0.5 | 21 g | Pass |
| Aquatac XR4316 | <0.5 | 8.4 g | Fail |
| | <0.5 | 10.8 g | Fail |
| | <0.5 | 16.8 g | Fail |
| Aquatac XR4324 | <0.5 | 8.4 g | Fail |
| DC 84 | N/A | 8.4 g | Fail |
| | N/A | 12.3 g | Fail |
| | N/A | 17.3 g | Fail |
| DLP 212 | N/A | 8.4 g | Fail |
| | N/A | 15 g | Fail |
| DLP 2141 | N/A | 8.4 g | Fail |
| | N/A | 15 g | Fail |
| Surfonyl 2502 | N/A | 10.2 | Fail |

Example 2

For producing aerated concrete having a wet density of 500 kg/m$^3$, the following step-wise procedure took place. Into a concrete mixer, 202.5 kg of water, 2.750 kg of a tenside mixture comprising 60% of a tenside sold under the trade name Dowfax 3B2™ tenside and 40% of a tenside sold under the trade name Darex AEA™ tenside, 0.420 kg resin sold under the trade name Aquataq XR4343™ resin and 103.0 kg of Portland cement was supplied. The compounds were stirred at a speed of 380 rpm for 25 s and resulted in a aerated concrete mixture. Then 191.25 kg of Portland cement was added continuously to the mixer within 70 s during agitation at a speed of 166 rpm. The agitation continued for further 320 s until a concrete mixture was obtained. The mixture was the poured into steel forms and allowed to cure at room temperature. After 28 days, the compressive strength were measured according to SS-EN 12390-3:2009, the flexural strength according to SS-EN 12390-5:2009, the shrinkage according to SS 137215, and the modulus of elasticity in compression according to SS 137232:2005. The results from the measurements are shown below:

Compressive strength: 1.9 MPa
Flexural strength: 0.2 MPa
Modulus of elasticity in compression: 0.7 MPa
Shrinkage after 14 days: 0.21%
Shrinkage after 21 days: 0.71%
Shrinkage after 35 days: 2.95%
Shrinkage after 63 days: 4.78%

While the present invention has been described in accordance with preferred compositions and embodiments, it is to be understood that certain substitutions and alterations may be made thereto without departing from the spirit and scope of the following claims.

I claim:

1. A pumpable aqueous concrete mixture having an air pore volume of 10-85 volume-%, comprising: a hydrophobic resin at least partially soluble in the concrete mixture wherein the hydrophobic resin having dispersible particles of the hydrophobic resin having a mean particle size in a range of 0.4-0.6 micrometer; the mean particle size referring to an average size of resin particles before addition to the concrete mixture; the concrete mixture having more than 210 grams of the hydrophobic resin per cubic meter of the concrete mixture and up to 840 grams of the hydrophobic resin per cubic meter of the concrete mixture, and wherein at least 90 wt % of the hydrophobic resin is dissolved in the concrete mixture.

2. The concrete mixture according to claim 1, wherein the water to cement weight ratio in the concrete mixture is in the range of 0.40 to 0.80.

3. The concrete mixture according to claim 1, wherein the air pore volume is in the range of 18-75 volume-%.

4. The concrete mixture according to claim 1, wherein the concrete mixture comprises:
- 100 parts by weight of cement,
- 35-80 parts by weight of water,
- 0-500 parts by weight of an aggregate material,
- 0.210-0.840 kilogram of the hydrophobic resin per cubic meter of concrete mixture, and
- 0.005-1 parts by weight of an anionic surface-active compound.

5. A concrete having a density of 250-2200 kilograms/cubic meter and an air pore volume in the range of 15-90 volume-%, wherein the concrete is obtained by curing a concrete mixture according to claim 1.

6. A pumpable aqueous concrete mixture according to claim 1, wherein the hydrophobic resin has dispersible particles that have a mean particle size of 0.5 micrometer.

* * * * *